United States Patent [19]
Heraly et al.

[11] Patent Number: 6,034,350
[45] Date of Patent: Mar. 7, 2000

[54] METHOD AND APPARATUS FOR INITIATING A WELDING ARC USING A BACKGROUND CIRCUIT

[75] Inventors: Todd M. Heraly, Green Bay; Kenneth A. Stanzel, Appleton, both of Wis.

[73] Assignee: Illinois Tool Works Inc., Glenview, Ill.

[21] Appl. No.: 09/053,194

[22] Filed: Apr. 1, 1998

[51] Int. Cl.[7] .................................................. B23K 9/067
[52] U.S. Cl. .................................. 219/130.4; 219/130.31
[58] Field of Search ........................... 219/130.4, 130.5, 219/130.51, 130.31, 130.32, 130.33, 137 PS

[56] References Cited

U.S. PATENT DOCUMENTS

| | | | |
|---|---|---|---|
| 3,356,928 | 12/1967 | Parrish | 219/130.32 |
| 3,530,359 | 9/1970 | Grist | 219/130.32 |
| 4,950,864 | 8/1990 | Campiotti et al. | 219/130.4 |
| 5,218,182 | 6/1993 | Vogel et al. | 219/130.32 |
| 5,308,952 | 5/1994 | Bunker et al. | 219/130.4 |
| 5,582,751 | 12/1996 | Hagiwara et al. | 219/130.4 |
| 5,645,741 | 7/1997 | Terayama et al. | 219/130.4 |
| 5,705,790 | 1/1998 | Klebl et al. | 219/130.4 |

*Primary Examiner*—Clifford C. Shaw
*Attorney, Agent, or Firm*—Mark W. Croll; Thomas W. Buckman; John P. O'Brien

[57] ABSTRACT

An apparatus for initiating a welding arc during a lift arc start. The apparatus includes a power circuit to provide welding power to a power output, a background circuit to provide background power to the power output to maintain the welding arc during low power welding processes, and a controller. The background circuit is enabled prior to drawing the welding arc, thus providing a background voltage to the power output of the welding device. The background voltage is monitored such that the controller can detect when the welder has touched the electrode to the workpiece. Upon detection of a short, the controller enables the power circuit to provide a flow of output current to the power output.

20 Claims, 4 Drawing Sheets

METHOD AND APPARATUS FOR INITIATING A WELDING ARC USING A BACKGROUND CIRCUIT

FIELD OF THE INVENTION

The present invention relates generally to a method and apparatus for initiating a welding arc, and more specifically to a method and apparatus for initiating a welding arc using a lift arc start method.

BACKGROUND OF THE INVENTION

Many methods of welding are known in the art, each with its own advantages and disadvantages. Common welding processes include gas welding, oxyacetylene brazing and soldering, shielded metal arc welding (SMAW) or "STICK" welding, metal inert gas (MIG) or "wire feed" welding, gas tungsten arc welding (GTAW) or "TIG" welding, and plasma cutting. TIG welding is perhaps the cleanest, most precise of all hand-held welding operations. Although the method and apparatus of the present invention is preferably directed to a TIG welding process, one skilled in the art will appreciate that the present invention may have applications in many other welding operations.

A TIG welding process will now be described with reference to FIG. 1. In TIG welding, a concentrated high-temperature arc is drawn between a non-consumable tungsten electrode 10 and a workpiece 14, workpiece 14 being connected to the output of a welding power source (not shown) via a work clamp 24. Electrode 10 rests in a torch 16, the torch including a protective gas source 18, such as a cup, to direct a protective gas 20, such as argon, helium, a mixture thereof, or other inert or non-inert gasses, to a welding site 22 on workpiece 14. Torch 16 receives a flow of protective gas 20 from a gas supply (not shown). The welder strikes an arc by touching or scraping electrode 10 against workpiece 14 to close a circuit between electrode 10 and work clamp 24. As electrode 10 is drawn away from workpiece 14, an arc 12 is initiated. The welder then feeds a bare welding rod 26 to welding site 22, thereby creating a molten puddle 28. Molten puddle 28 hardens to leave a weld bead 30 joining two pieces of metal.

Numerous problems persist with this physical method of striking an arc because the tip of the tungsten electrode becomes molten from the current flowing between the electrodes and the workpiece. When the electrode is pulled back from the workpiece, the molten tungsten is left behind in the weld puddle. In certain circumstances, this contamination can cause a failure in the weld. Also, the welder must then resharpen or replace the electrode. Not only does this process inconvenience the welder, but it also wastes time and resources, which ultimately imparts a higher cost to each weld.

One known solution to the above problems has been to use a high frequency signal to initiate and maintain the arc. A high frequency signal ionizes the protective gas, allowing the welding power to jump the gap between electrode and workpiece. However, high frequency, too, has its drawbacks. The high voltage, low amperage noise from the high frequency circuitry often causes electrical interference with surrounding equipment, making its use unacceptable in certain applications. Also, the HA can be tough on TIG torches and work leads because the high voltage causes a stress to be applied to the insulation of the weld cables.

Another arc starting method which avoids the problems associated with the scratch start is the "lift" arc method. Lift arc starting involves touching the electrode to the workpiece without the necessary scraping to generate a spark. Known lift arc methods utilize a separate low-current power circuit, in addition to the power circuits already present in a welding device, to create a small monitoring voltage between the electrode and work clamp. Control circuitry monitors the voltage between the electrode and work clamp and, when a short is detected (i.e., the electrode has been touched to or brought in close proximity with the workpiece), enables the power circuit to provide an initial regulated current to warm, but not melt the electrode. When the control circuitry detects a significant torch-to-work voltage (i.e., the electrode is no longer touching or is not in close proximity to the workpiece), the control circuitry enables the power circuit to provide full user-selected welding power. However, the separate power circuit required to provide the small monitoring voltage leads to additional cost and complexity of the circuitry in the welding power source. Furthermore, existing lift arc start methods fail to reliably regulate the output current level before and after the short is detected.

Accordingly, there is a need for a method and apparatus for initiating and maintaining a welding arc that overcomes the limitations of known arc starting methods, such as the problems associated with a scratch start, the disadvantages of using a high frequency circuit, and the need for additional costly and complex circuitry. Moreover, such a method and apparatus would reliably regulate the output current both before and after a short is detected in the lift arc start.

SUMMARY OF THE INVENTION

These and other needs are accomplished by the method and apparatus of the present invention in which, according to one embodiment, a welding device includes a power circuit to provide an output current that creates an arc between an electrode and a workpiece, the power circuit having a control input. The welding device further includes a supplemental power source or background circuit to maintain the arc during a low power welding process by providing a supplemental voltage at the welding output, and a control circuit to monitor the supplemental voltage. When the supplemental voltage is below a predetermined voltage, the control circuit provides a control signal to enable the flow of output current from the power circuit.

According to one feature of the invention, the control circuit provides a second control signal to regulate the flow of output current when the supplemental voltage exceeds the predetermined voltage.

In another aspect of the invention, the power circuit is a phase-controlled power circuit.

According to another embodiment of the present invention, a method for initiating an arc includes applying a background current and voltage to a power output to maintain the arc during a low power welding process, monitoring the magnitude of the background voltage, and enabling a flow of output current to the power output when the background voltage indicates that the electrode is in close proximity of the workpiece.

BRIEF DESCRIPTION OF THE DRAWINGS

The preferred exemplary embodiment of the invention will hereinafter be described in conjunction with the appended FIGURES, in which like reference numerals denote like elements and.

DETAILED DESCRIPTION OF A PREFERRED EMBODIMENT

Figure 2:
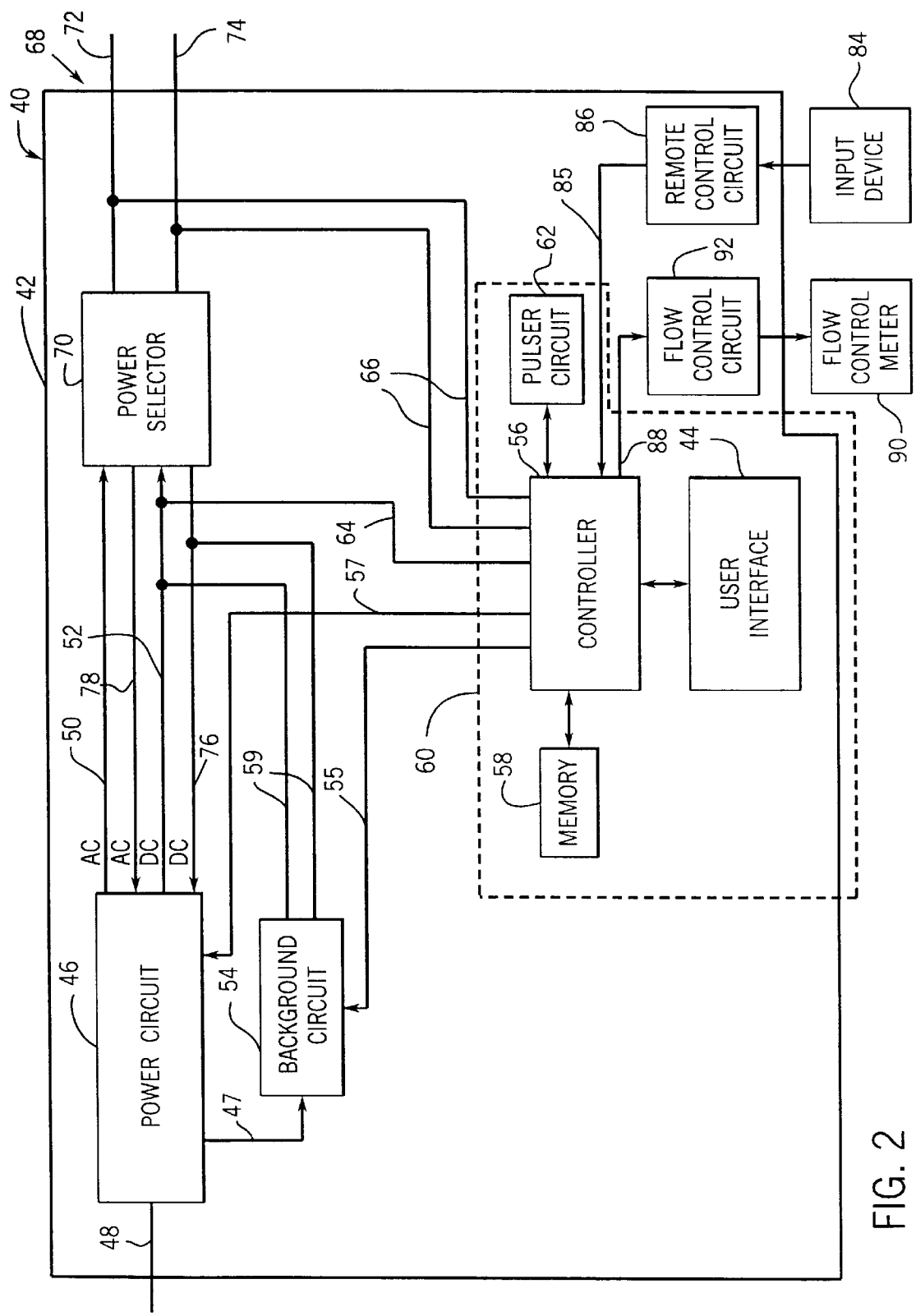
FIG. 2 is a block diagram of a welding device according to a preferred embodiment of the present invention, the welding device having the capability to start an arc for performance of a welding process, such as the TIG welding process shown in FIG. 1.

Referring to FIG. 2, there is shown a block diagram of a welding device 40 according to a preferred embodiment of the present invention. Welding device 40 includes a power source 42, and may include other welding equipment not shown such as torch 16, a gas supply, a stand and other welding components well-known in the art. Welding device 40 is preferably a TIG/STICK welding device, allowing the welder to use device 40 for either TIG or STICK welding by selecting the appropriate operation via user interface 44 and attaching the necessary welding equipment, e.g. a torch and gas supply for TIG welding, or an electrode holder for STICK welding.

Power source 42 includes a power circuit 46. Power circuit 46 receives input power from a power input 48 and converts it to both AC and DC welding power available at AC and DC power outputs 50, 78 and 52, 76, respectively. Power circuit 46 is preferably a phase-controlled power source utilizing silicon controlled rectifiers (SCRs) to convert power received at power input 48 to usable welding power, as is well-known in the art. Alternatively, one skilled in the art could apply the principles of the present invention to other well-known power converter and converter topologies A controller 56 is operatively coupled to power circuit 46. Controller 56 includes a microprocessor, preferably an Intel 80C196KC-20 which performs many control functions in welding device 40. Alternatively, controller 56 could include discrete component control circuitry to perform these control functions. Controller 56 controls the output power from power circuit 46 by generating control signals at path 57 to control the switching components (e.g., the SCRs) in power circuit 46.

Controller 56 receives user-selected operating parameters from user interface 44. In this preferred embodiment, user interface 44 includes a plurality of selectors (not shown) operable by the user to select a welding process (STICK/TIG), a current control (PANEL/REMOTE), an output control (ON/REMOTE), a start mode (OFF/LIFT/HFSTART/HFCONT), a pulser function and parameters related thereto, a positive/negative balance control for AC TIG welding, a DIG control for STICK welding, an amperage level, a spot welding operation, and a sequence selection such as start current, final (crater) current, or both. Controller 56 also transmits to user interface 44 information about the welding operation that is valuable to the welder, including arc voltage, arc amperage, and preferred selector settings. Controller 56 is further coupled to a pulser circuit 62 for performing a pulser function as is well-known in the art. A memory 58 is coupled to controller 56 for storing data including the settings of the selectors on user interface 44 for future recall after power-down or between welding cycles.

Referring still to FIG. 2, controller 56 receives current feedback signals indicative of the DC output current level from DC power output 52, 76 via a current feedback path 64.

Controller 56 also receives voltage feedback signals indicative of the voltage at a power output 68 via voltage feedback path 66. Power output 68 includes an electrode terminal 74 adapted to receive a torch electrode and a work clamp terminal 72 adapted to receive a work clamp or other workpiece reference element. A power selector 70 provides user-selectable control of the type of output power provided at power output 68 (e.g., AC, DC electrode negative, or DC electrode positive).

Welding device 40 further includes a supplemental power source, such as a background circuit 54 which, typically during DC welding processes, is enabled by controller 56 via a control input 55 to maintain the welding arc during low amperage welding conditions (i.e., at output current levels of approximately 15 amperes or less). Background circuit 54 receives input power from power circuit 46 along path 47 and applies a small, supplemental amount of power to DC power output 52, 76, which is provided to power output 68 when a DC output is selected via power selector 70. The supplemental power is needed to maintain the welding arc because, at low amperage conditions, the output current provided by power circuit 46 may be discontinuous, which may allow the welding arc to extinguish. Background circuit 54 may be any type of power source capable of providing a small, supplemental voltage and current (i.e., power) at power output 68, such as the exemplary background circuit illustrated in FIG. 2A.

Figure 2A:
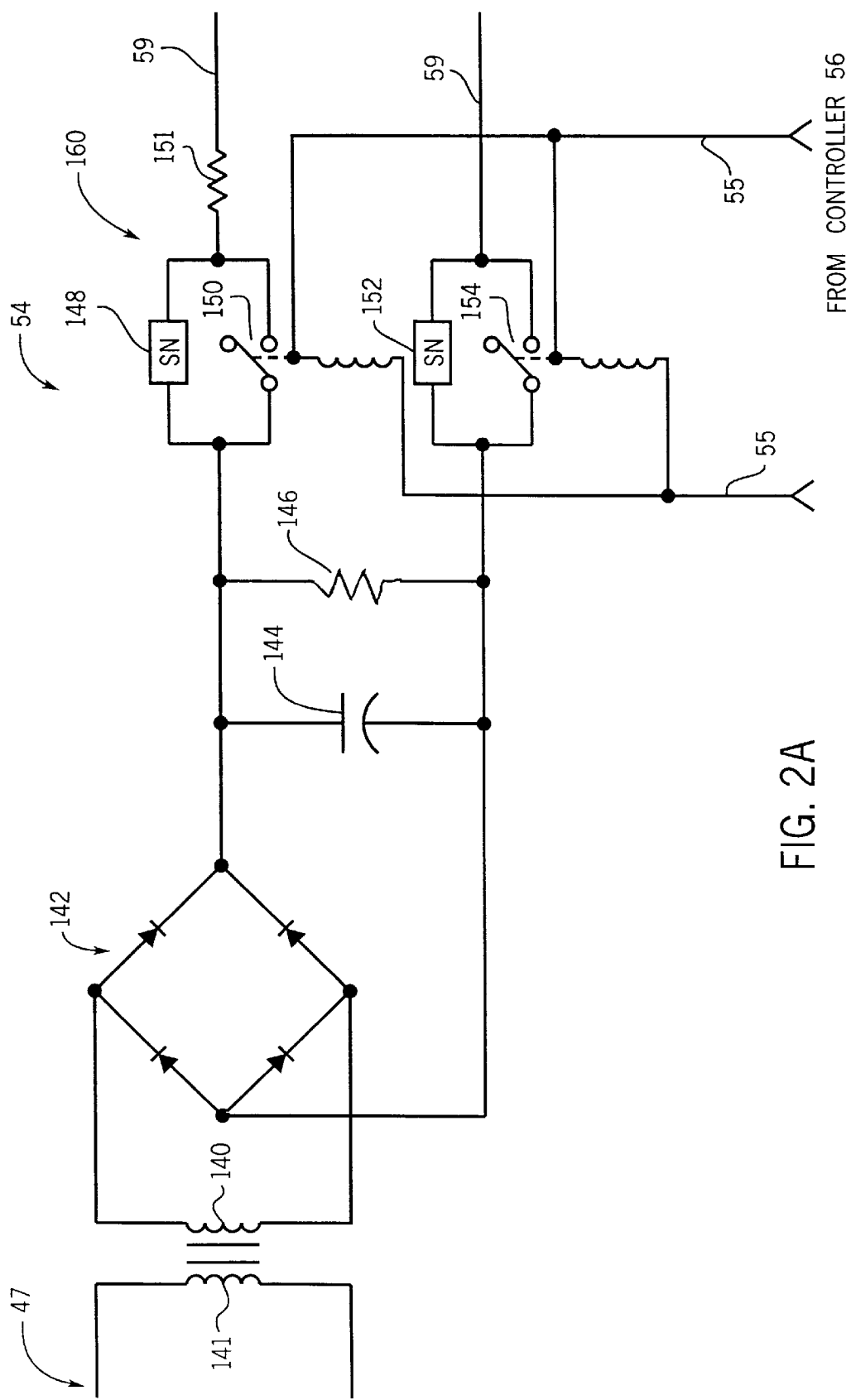
FIG. 2A is a schematic of a background circuit according to a preferred embodiment of the present invention.

Referring now to FIG. 2A, FIG. 2A is a schematic of a background circuit according to an exemplary embodiment of the present invention. Background circuit 54 receives input power from power circuit 46, such as via a secondary winding 140 off the power circuit's main power transformer 141. Background circuit 54 includes a full wave bridge rectifier 142 coupled to secondary winding 140 for rectifying the AC signal. Background circuit 54 also includes a capacitor 144 and resistor 146 for filtering the rectified signal waveform to a substantially DC signal. This substantially DC signal is provided to the background circuit output 59 only if enabled by controller 56 through switching network 160. Switching network 160 responds to an enable or disable signal received on control input 55 by closing or opening relay switches 150, 154, respectively. Switching network 160 further includes snubbers 148, 152, or similar filtering devices for removing voltage spikes due to the switching of relay switches 150, 154. Background circuit 54 further includes a current-limiting resistor 151 coupled to the output of switching network 160.

Figure 1:
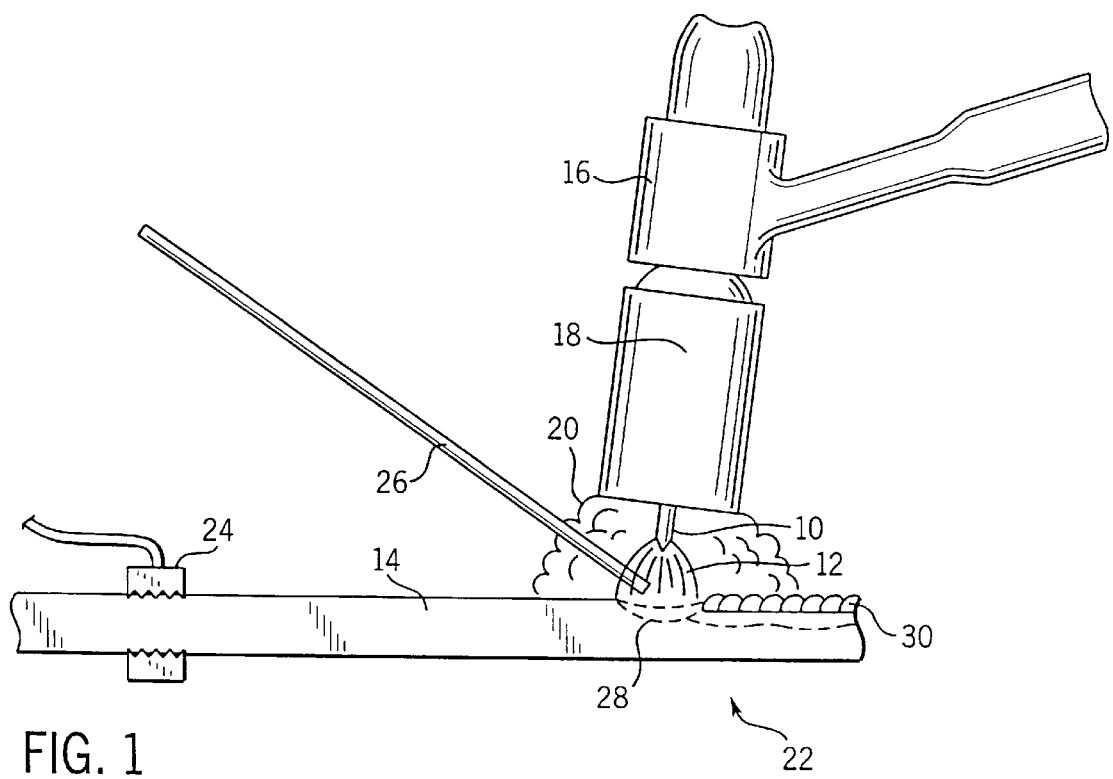
FIG. 1 illustrates the components used to perform a TIG welding operation as is known in the art.

Controller 56 also receives remote control inputs from an input device 84 through a remote control circuit 86 via a path 85. Input device 84 is user-operable and can be used to control welding power output. The flow of protective gas is also controlled by controller 56. In this embodiment, a control signal is sent from controller 56 via a path 88 through a flow control circuit 92 to a flow control meter 90. Flow control meter 90 is coupled to a gas supply (not shown) for regulating the flow of protective gas from the gas supply to the welding site (see FIG. 1). Alternatively, flow control meter 90 could be internal power source 42 with a gas flow channel (not shown) extending from the gas supply, through power source 42, through flow control meter 90, then out to torch 16 for provision to welding site 22 through gas source 18.

Power source 42 may have more or fewer functions than those illustrated in FIG. 2 without departing from the scope of the present invention (e.g. power source 42 may not include pulser circuit 62). Additionally, embodiments of the functions shown may be wide and varied. For example, input device 84 could be a finger trigger, a foot pedal, or some other type of input device.

Figure 3:
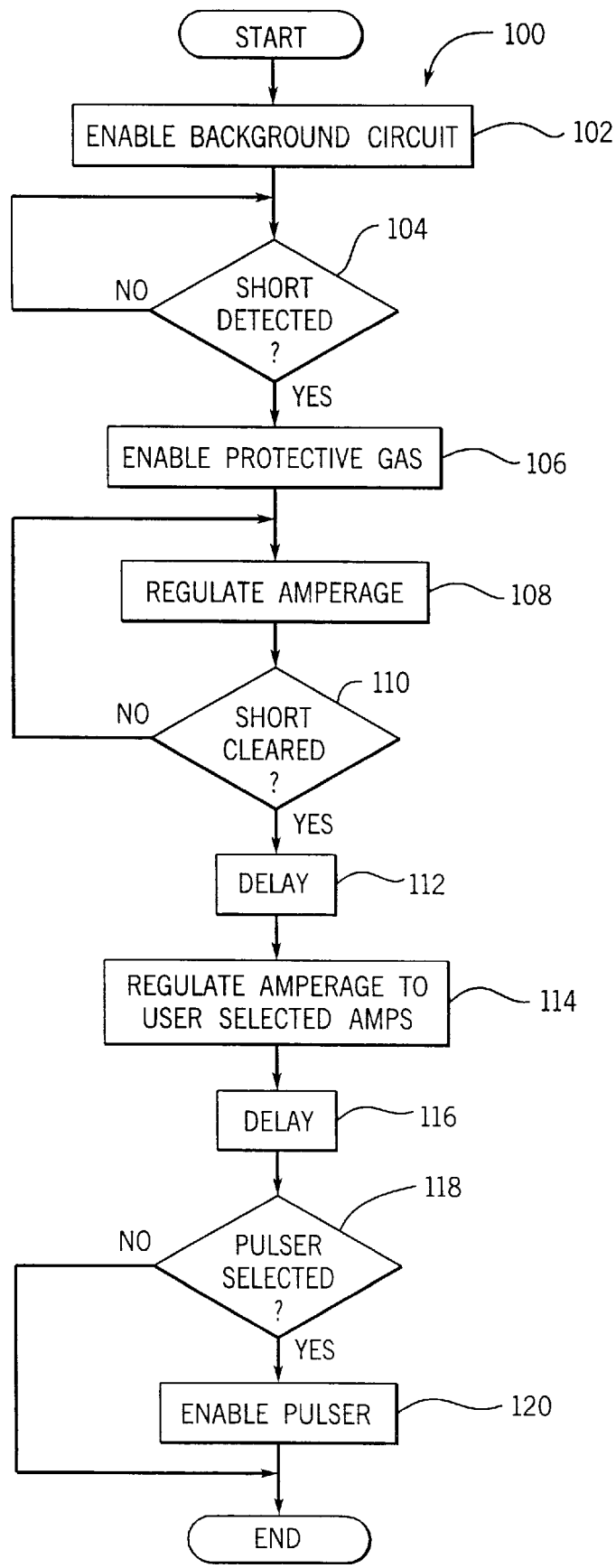
FIG. 3 is a flowchart showing the steps of the method that the welding device of FIG. 2 follows to start a welding arc in accordance with a preferred embodiment of the present invention.

Referring now to FIG. 3, FIG. 3 is a flowchart showing the steps of a method for initiating a welding arc according to a preferred embodiment of the present invention. The method steps are preferably controlled by controller 56, according to program code stored within controller 56, in conjunction with the various circuitry described above with reference to FIGS. 2 and 2A. The method of FIG. 3 preferably starts a DC TIG process. However, the method, and derivations thereof, will find applications in other welding processes and start modes.

Referring to FIG. 3, the welder begins by setting welding device 40 to DC TIG and the start mode to LIFT start via user interface 44. User interface 44 may also be used at this time to select other welding parameters, such as the welding current level and the pulser function. When output control is turned ON, either by a selector on user interface 44 or by remote input device 84, start mode 100 begins. At a step 102, controller 56 enables background circuit 54, which then applies a background voltage at power output 68, preferably having a magnitude of approximately 58 volts DC (VDC), although the magnitude could be in the range of approximately 1 VDC to approximately 100 VDC. Controller 56 monitors power output 68 via voltage feedback path 66. Power output 68 alternatively could be monitored by any type of monitoring circuitry that is configured to provide feedback signals to controller 56 that are representative of the voltage at power output 68.

At a step 104, the power output 68 is monitored to determine when the welder has touched or brought electrode 10 in close proximity to workpiece 14. That is, power output 68 is monitored to determine when a short circuit has occurred which will correspond to a drop in the background voltage at power output 68 to a magnitude between approximately 2 VDC and approximately 6 VDC, and preferably to a magnitude less than or equal to 4 VDC.

Once a short is detected at step 104, controller 56 enables a flow of protective gas by sending an enable signal along path 88, through flow control circuit 92 to flow control meter 90 (step 106). Also when the short is detected at step 104, at a step 108, controller 56 enables power circuit 46 to provide a flow of output current at power output 68 by providing a control signal at control input 57. In the preferred embodiment, controller 56 enables power circuit 46 to provide a low level of output current that ramps up to a final level of, for example, 40 amperes. The final level may be more or less than 40 amperes, provided that the final current level, in conjunction with the ramp-up time, is sufficient to pre-heat electrode 10 without melting electrode 10, thus preventing sticking of the electrode to the workpiece. Controller 56 receives current feedback signal 64 to assist in regulating the flow of output current at the final level.

Next, to draw the arc, the welder must remove electrode 10 a distance from workpiece 14. At a step 110, controller 56 is able to detect that the electrode has been removed and, thus, that the short has cleared by again monitoring power output 68 via voltage feedback path 66. When an output voltage at power output 68 of more than about 4 VDC is detected, the short is deemed cleared and a welding arc should be initiated. At a step 112, controller 56 delays for approximately 20 milliseconds to ensure that a valid arc has been established (i.e., the output voltage remains in a range of approximately 4 VDC to 50 VDC). After the delay of step 112, at a step 114, controller 56 applies a control signal to control input 57 to cause power circuit 46 to regulate the flow of output current to the selected welding current level. When a valid arc has been established for about 0.75 seconds (step 116), controller 56 enables pulser circuit 62 if it has been selected (steps 118 and 120). Although the output voltage at power output 68 that is indicative of a valid arc preferably is between about 4 VDC and 50 VDC, higher and lower voltages are possible.

Although the foregoing description has been provided for the presently preferred embodiment of the invention, the invention is not intended to be limited to any particular arrangement, but is defined by the appended claims. For example, a method for initiating and maintaining a welding arc need not include all of the steps of start mode 100, nor need the method include all the same time periods and amperage values as in the presently preferred embodiment. Reasonable ranges as would be known to those skilled in the art should be presumed to be part of the present invention. Likewise, although DC TIG is the preferred process in this embodiment, the present invention has applications in numerous other welding processes and devices. These and other alternative configurations of the invention that may occur to those skilled in the art are intended to form a part of the invention to the extent such alternatives fall within the scope of the appended claims.

What is claimed is:

1. A welding device having a welding output, the welding device being configured to provide a flow of output current that creates an arc between an electrode and a workpiece coupled to the welding output, the welding device comprising:

a power circuit to provide the flow of output current, the power circuit having a control input;

a supplemental power source to maintain the welding arc between the electrode and the workpiece during a low power welding process, the supplemental power source providing a supplemental voltage at the welding output; and a control circuit to monitor the supplemental voltage, the control circuit providing a first control signal at the control input of the power circuit to enable the flow of output current when the magnitude of the supplemental voltage at the welding output is less than or substantially equal to a predetermined magnitude.

2. The welding device as recited in clam 1, wherein the predetermined magnitude is between approximately 2 volts and 6 volts.

3. The welding device as recited in claim 1, wherein the predetermined magnitude is approximately 4 volts.

4. The welding device as recited in claim 1, wherein the control circuit provides a second control signal at the control input of the power circuit to regulate the flow of output current at a selected welding current level when presence of an arc is detected.

5. The welding device as recited in claim 4, wherein the presence of the arc is detected when the control circuit detects an output voltage at the power output having a magnitude between approximately 2 volts and 6 volts.

6. The welding device as recited in claim 4, wherein the presence of the arc is detected when the control circuit detects an output voltage at the power output having a magnitude of approximately 4 volts.

7. The welding device as recited in claim 1, wherein the power circuit is a phase-controlled power circuit.

8. The welding device as recited in claim 1, the control circuit providing the first control signal at the control input of the power circuit to enable the flow of output current when the magnitude of the supplemental voltage at the welding output indicates a short circuit between the electrode and the work piece.

9. A method for initiating an arc between an electrode and a workpiece coupled to a power output of a welding device, the method comprising:

applying a background current and a background voltage at the power output to maintain the arc during a low power welding process;

monitoring the background voltage; and enabling a flow of welding current to the power output when the magnitude of the background voltage applied at the power output indicates that the electrode is in close proximity to the workpiece.

10. The method as recited in claim 9, wherein the magnitude of the background voltage indicates that the electrode is in close proximity to the workpiece when the magnitude is between approximately 2 volts and 6 volts.

11. The method as recited in claim 9, wherein the magnitude of the background voltage indicates that the electrode is in close proximity to the workpiece when the magnitude is approximately 4 volts.

12. The method as recited in claim 9, wherein enabling the flow of welding current includes enabling a phase-controlled power circuit.

13. The method as recited in claim 9, further comprising regulating the flow of welding current to a welding current level when the magnitude of on output voltage at the monitored power output indicates the presence of an arc between the electrode and the workpiece.

14. The method as recited in claim 13, wherein the magnitude of the output voltage indicates the presence of the arc when the magnitude is greater than approximately 4 volts.

15. The method as recited in claim 9, wherein the flow of welding current is enabled when the magnitude of the background voltage applied at the power output indicates a short circuit between the electrode and the workpiece.

16. A welding device having a welding output, the welding device being configured to provide a flow of output current that creates an arc between an electrode and a workpiece coupled to the welding output, the welding device comprising:

a phase-controlled power circuit to provide the flow of output power, the phase-controlled power circuit having a control input;

a background circuit to maintain the arc between the electrode and the workpiece during a low power welding process, the background circuit providing a background voltage at the welding output; and a control circuit to monitor the background voltage, wherein the control circuit provides a first control signal at the control input of the power circuit to enable the flow of output current when the magnitude of the background voltage at the welding output indicates that the electrode is in close proximity to the workpiece, and provides a second control signal at the control input to regulate the flow of output current to a welding current level when the control circuit detects an output voltage at the welding output that indicates presence of the arc between the electrode and the workpiece.

17. The welding device as recited in claim 16, wherein the background voltage indicates that the electrode is in close proximity to the workpiece when the magnitude is less than or substantially equal to 4 volts.

18. The welding device as recited in claim 16, wherein the background voltage indicates that the electrode is in close proximity to the workpiece when the magnitude is between approximately 2 volts and 6 volts.

19. The welding device as recited in claim 16, wherein the output voltage indicates the presence of the arc when the magnitude is greater than 4 volts.

20. The welding device of claim 16, wherein the control circuit provides the first control signal at the control input of the power circuit to enable the flow of output current when the magnitude of the background voltage at the welding output indicates a short circuit between the electrode and the workpiece.

* * * * *